(12) United States Patent
Nam et al.

(10) Patent No.: US 11,341,324 B2
(45) Date of Patent: May 24, 2022

(54) AUTOMATIC TEMPLATE GENERATION WITH INBUILT TEMPLATE LOGIC INTERFACE

(71) Applicant: DocuSign, Inc., San Francisco, CA (US)

(72) Inventors: Marshall Nam, San Francisco, CA (US); Caitlan Corbin, San Francisco, CA (US); Stanislav Gurenkov, San Francisco, CA (US); Andrew Weaver, Seattle, WA (US); Kiah Jones, Seattle, WA (US); Madhubala Rawat, San Francisco, CA (US)

(73) Assignee: DocuSign, Inc., San Francisco, CA (US)

( * ) Notice: Subject to any disclaimer, the term of this patent is extended or adjusted under 35 U.S.C. 154(b) by 371 days.

(21) Appl. No.: 16/687,662

(22) Filed: Nov. 18, 2019

(65) Prior Publication Data

US 2021/0149992 A1 May 20, 2021

(51) Int. Cl.
*G06F 40/00* (2020.01)
*G06F 40/186* (2020.01)
*G06F 40/169* (2020.01)
*G06F 40/174* (2020.01)

(52) U.S. Cl.
CPC .......... *G06F 40/186* (2020.01); *G06F 40/169* (2020.01); *G06F 40/174* (2020.01)

(58) Field of Classification Search
CPC ..... G06F 40/186; G06F 40/169; G06F 40/174
See application file for complete search history.

(56) References Cited

U.S. PATENT DOCUMENTS

| | | | | |
|---|---|---|---|---|
| 6,820,235 | B1 * | 11/2004 | Bleicher | G06F 19/325 715/236 |
| 7,206,998 | B2 * | 4/2007 | Pennell | G06F 16/957 715/224 |
| 7,275,216 | B2 * | 9/2007 | Paoli | G06F 40/14 715/763 |
| 7,810,036 | B2 * | 10/2010 | Bales | G06F 16/954 715/742 |

(Continued)

OTHER PUBLICATIONS

Jotform, "How to Show or Hide Fields Base on User's Answer", Dec. 29, 2018, 5 pages https://www.jotform.com/help/316-How-to-Show-or-Hide-Fields-Base-on-User-s-Answer.*

(Continued)

*Primary Examiner* — William L Bashore
*Assistant Examiner* — David Faber
(74) *Attorney, Agent, or Firm* — Fenwick & West LLP

(57) ABSTRACT

An automatic template system can allow users to create automatic templates and use the automatic templates to generate documents using data from a linked CRM system. To facilitate the generation of automatic templates, the automatic template system can provide a template creation interface allowing a user to generate an automatic template (including setting up template logic). The template creation interface can include a CRM integration area with a set of tagged data fields representing relevant data from a linked CRM database and a document editing area allowing a user to edit document content, insert merge fields linked to tagged data fields, and edit template logic via an inline logic interface for adding and modifying template logic.

20 Claims, 8 Drawing Sheets

(56) References Cited

U.S. PATENT DOCUMENTS

| | | | |
|---|---|---|---|
| 9,009,585 B1* | 4/2015 | Chetrit | G06F 9/24 |
| | | | 715/221 |
| 10,013,400 B1 | 7/2018 | Zetlen | |
| 2002/0035486 A1* | 3/2002 | Huyn | G16H 40/67 |
| | | | 705/3 |
| 2005/0268217 A1* | 12/2005 | Garrison | G06F 40/174 |
| | | | 715/234 |
| 2006/0074866 A1 | 4/2006 | Chamberlain et al. | |
| 2006/0190810 A1* | 8/2006 | Piersol | G06F 40/226 |
| | | | 715/236 |
| 2007/0055939 A1 | 3/2007 | Furlong et al. | |
| 2011/0197119 A1 | 8/2011 | Ye et al. | |
| 2012/0036427 A1 | 2/2012 | Osaka et al. | |
| 2014/0075280 A1* | 3/2014 | Laakmann | G06F 16/00 |
| | | | 715/225 |
| 2014/0136958 A1* | 5/2014 | Scattergood | H04L 67/2895 |
| | | | 715/236 |
| 2015/0095752 A1* | 4/2015 | Studer | G06F 40/18 |
| | | | 715/212 |
| 2015/0254366 A1* | 9/2015 | Ravagnani | G06F 16/258 |
| | | | 709/204 |
| 2016/0239805 A1* | 8/2016 | Geffen | G06Q 10/10 |
| 2017/0286389 A1* | 10/2017 | Ceneviva | G06F 40/174 |
| 2019/0147033 A1* | 5/2019 | Morse | G06F 40/106 |
| | | | 715/222 |

OTHER PUBLICATIONS

Haas, Jessica, "Here to Help: Spotlight on Conditional Logic" Oct. 19, 2016, 7 pages https://www.formstack.com/resources/blog-spotlight-on-conditional-logic.*

* cited by examiner

AUTOMATIC TEMPLATE GENERATION WITH INBUILT TEMPLATE LOGIC INTERFACE

BACKGROUND

This disclosure relates generally to automatic template generation and an automatic template generation system and interface.

Templates can be used to generate documents with a standardized format. Manual templates can function and be stored similarly to a partially completed shell of the document to be created, containing standardized document content and one or more incomplete sections for customized content specific to the generated document. However, while easy to generate (requiring only the same system and/or program that would be needed to generate the document to be created from scratch) manual templates still require significant work to generate a final document using the template.

Therefore, an automatic template can be implemented to generate standardized documents without requiring manual user input to generate the document. Instead, an automatic template automatically generates documents using data retrieved from a database (or other similar data store) to automatically customize the document for a particular use case. This provides an immense usability benefit to the end users of the automatic template, further speeding the process of generating standardized documents.

However, the difficulty in generating an automatic template prevents more widespread use of automatic templates, in many cases restricting the application of automatic templates to only the most commonly generated documents which can justify the expense (and extra time) required to generate an automatic template using previous methods.

For example, the existing process of setting up an automatic template can involve manually coding template logic within a document editor program separate from the automatic template system and/or switching between multiple applications to edit document content and template logic. Many previous systems for generating an automatic template rely on users having coding and/or scripting knowledge and specialized knowledge of the specific automatic template.

SUMMARY

An automatic template system can allow users to create automatic templates and use the automatic templates to generate documents using data from a linked customer relationship management (CRM) system (or other database). To facilitate the generation of automatic templates, the automatic template system can provide a template creation interface allowing a user to generate an automatic template (including setting up template logic). The template creation interface can include a CRM integration area with a set of tagged data fields representing relevant data from a linked CRM database and a document editing area allowing a user to edit document content and insert merge fields linked to tagged data fields. Additionally, the document editing area can allow a user to seamlessly expand an inline logic interface for adding and modifying template logic. The inline logic interface does not require scripting, but instead allows a user to set up conditions for displaying conditional document sections based on a logic trigger field linked to a tagged data field of the CRM database.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

As described above, templates can be used to simplify the generation of documents with a standardized format. Traditional manual templates can function similarly to a partially completed shell of the document to be created, containing standardized document content and a set of fields or blank spaces for customized data to be inserted into. For example, to create a document based on a manual template a user can fill in each field with an appropriate value as needed using a standard word processing application. Likewise, the user can look up correct information for each field in a database or other data store and manually enter that information into the appropriate field of the manual template.

In contrast, an automatic template can be used to generate standardized documents without requiring the user to manually input data for each of the template's fields. Instead, an automatic template generates a document based on the document content included in the template and data retrieved from a database (or other similar data store) used to fill the fields of the template. As used herein, an "automatic template" is a template which can generate a document based on document content of the automatic template and data retrieved from a database (or other similar data store), for instance without requiring manual entry of the data by a user.

In some embodiments, a user of an automatic template system can select an automatic template and an entity with corresponding data in a database (for example, a specific user profile, or client data entry) and the automatic template system will retrieve data from the database to fill fields and generate the desired document using the automatic template.

Automatic Template System Architecture

Figure 1:
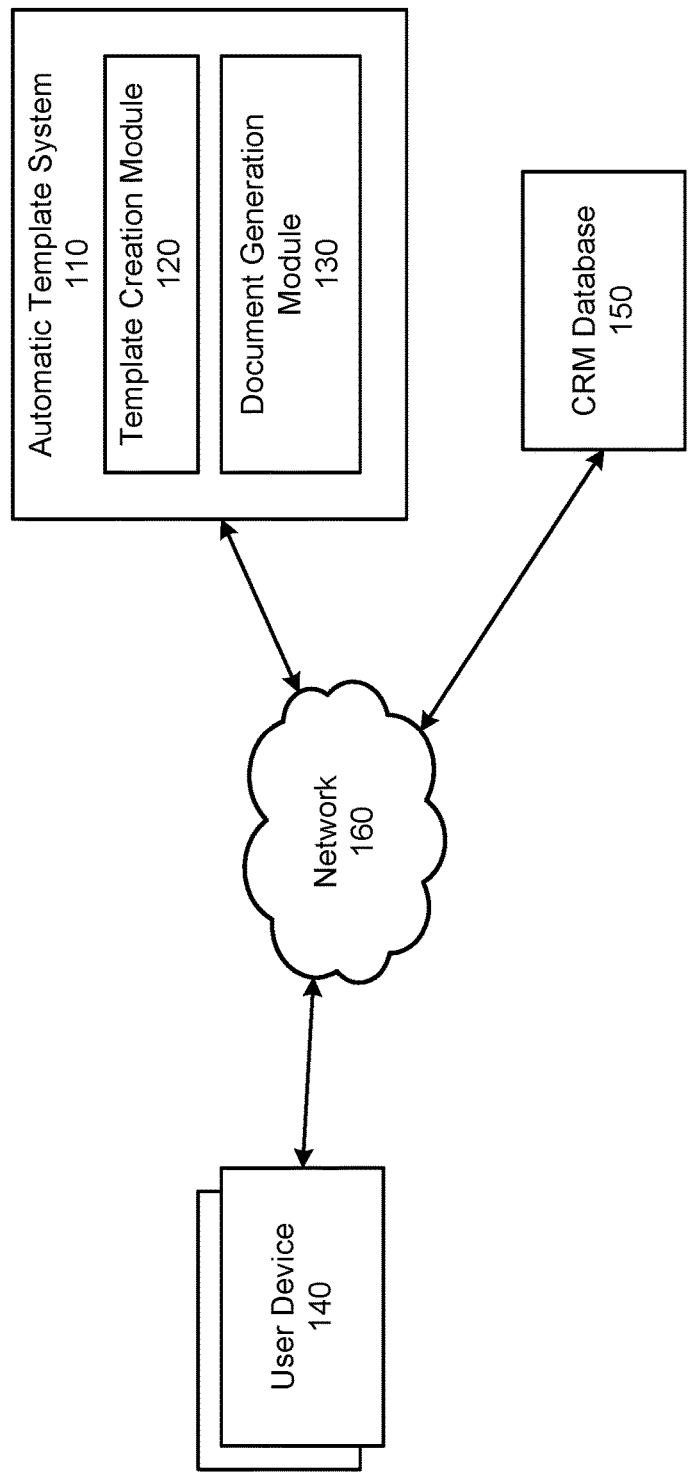
FIG. 1 is a block diagram of a system environment in which an automatic template system operates, according to one embodiment.

FIG. 1 is a block diagram of a system environment in which an automatic template system operates, according to one embodiment. The system environment 100 shown by FIG. 1 comprises an automatic template system 110 including a template creation module 120 and a document generation module 130, a CRM database 150, one or more user devices 140, and a network 160. In alternative configurations, different and/or additional components may be included in the system environment 100.

The automatic template system 110 can allow users to create automatic templates and employ one or more automatic templates to generate documents based on information from the CRM database 150 (or another database, depending on the embodiment). In some embodiments, the automatic template system 110 can access information stored in the CRM database 150 through an API (application programming interface) or database query. Automatic templates of the automatic template system 110 can include document content common to documents generated using the template (for example, formatted document text, images, or embedded video), a set of merge fields to be filled with data specific to each document (for example, with data retrieved from the CRM database 150), and, in some cases, template logic controlling whether a certain conditional document section and/or fields will appear in a given document generated with the automatic template. The template logic included in automatic templates of the automatic template system 110 can comprise one or more "logic conditions" which, if satisfied, affect the inclusion of an associated conditional document section in the generated document. A conditional document section can include conditional document text and/or merge fields which will be included in a generated document if the associated logic condition is satisfied. For example, an automatic template can be used to generate a contract for a service agreement, with merge fields related to the known information about the client and the service purchase, and with template logic to include different clauses depending on the specific service being purchased.

The template creation module 120 can allow users to generate automatic templates through an interface allowing a user to add document content and template logic to the automatic template. In some embodiments, the template creation module 120 provides a web-based application user interface (UI) allowing the user to enter document content and configure template logic in an integrated UI. The template creation module can integrate with the CRM database 150 or other outside source of information. The template creation module 120 will be discussed further in relation to FIG. 2.

In the embodiment of FIG. 1, the document generation module 130 allows users to generate documents using one or more automatic templates (such as the templates generated by the template creation module 120). In some embodiments, the document generation module 130 can generate a document based on a selection of a relevant entity associated with data in the CRM database 150. For example, a document can be generated based on an automatic template and the selection of a certain account, user profile, or potential transaction with corresponding information stored in the CRM database 150. In some embodiments (such as the embodiment of FIG. 1), the document generation module 130 is a part of the automatic template system 110, but the document generation system 130 can be a standalone system or otherwise on a separate server with access to automatic templates generated by the automatic template system 110.

The user devices 140 are one or more computing devices capable of receiving user input as well as transmitting and/or receiving data via the network 160. For example, a user device 140 can be a desktop or a laptop computer, a smartphone, tablet, or another suitable device. A user device 140 is configured to communicate via the network 160. In one embodiment, a user device 140 executes an application allowing a user of the user device 140 to interact with the automatic template system 110. For example, a user device 140 can execute a browser application to enable interaction between the user device 140 and the automatic template system 110 via the network 160.

The CRM database 150 is a database or set of databases containing information about a set of entities grouped into one or more types, where the CRM database 150 contains similar data about entities of the same types. In some embodiments, each entity type is associated with a set of data fields (for example, based on the specific schema of the CRM database 150) in which information about that entity is stored. For example, the CRM database 150 can contain information about a set of users associated with an entity type of "user profile" or "employee" and data fields such as "name" and "street address." Another embodiment of a CRM database 150 can contain a "transaction" entity type with data fields such as "quantity" and "total cost." In some embodiments, an automatic template system 110 can interface with other similar databases in place of or in addition to the CRM database 150. For example, the automatic template system 110 can interface with and retrieve data from a HRM (human resources management) database, an ERP (enterprise resource planning) database, or a custom database or data store accessible through an API.

The network 160 may comprise any combination of local area and/or wide area networks, using both wired and/or wireless communication systems. In one embodiment, the network 160 uses standard communications technologies and/or protocols. For example, the network 160 includes communication links using technologies such as Ethernet, 802.11, worldwide interoperability for microwave access (WiMAX), 3G, 4G, code division multiple access (CDMA), digital subscriber line (DSL), and the like. Data exchanged over the network 160 may be represented using any suitable format, such as hypertext markup language (HTML) or extensible markup language (XML). In some embodiments, all or some of the communication links of the network 160 may be encrypted using any suitable technique or techniques.

Figure 2:
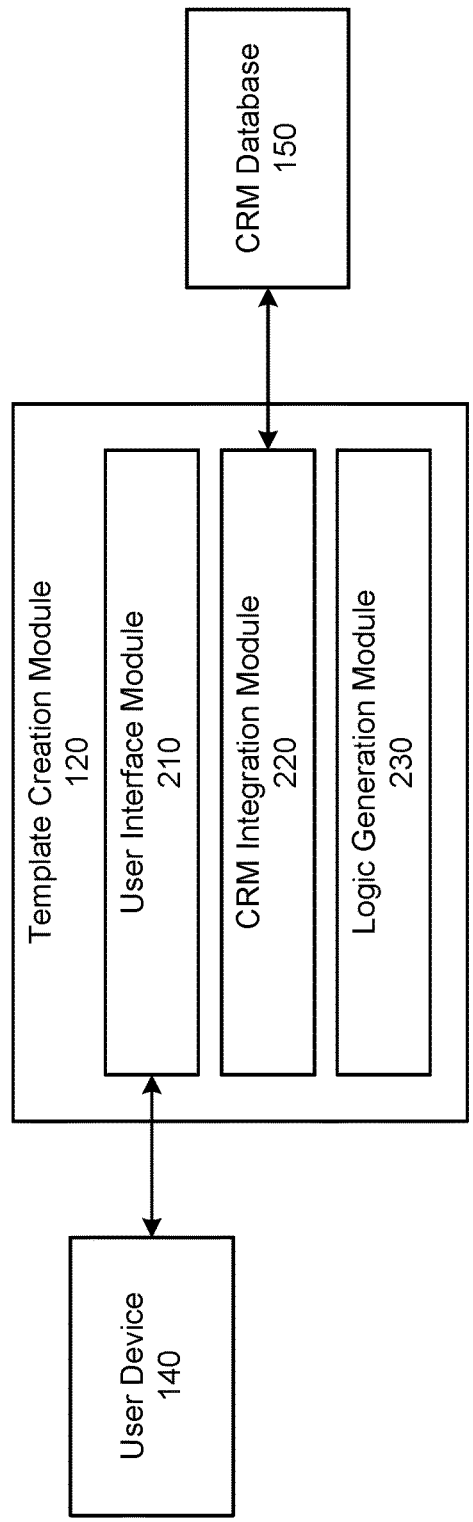
FIG. 2 is a block diagram of a template creation module, according to one embodiment.

FIG. 2 is a block diagram of a template creation module, according to one embodiment. The environment 200 of FIG. 2 shows the template creation module 120 including a user interface module 210 in communication with the user device 140, a CRM integration module 220 linked to the CRM database 150, and a logic generation module 230. In alternative configurations, different and/or additional modules may be included in the template creation module 120. Conventional components such as network interfaces, security functions, load balancers, failover servers, management and network operations consoles, and the like are not shown so as to not obscure the details of the system architecture.

The user interface module 210 can generate a user interface for the user to interact with to generate an automatic template (such as via a user device 140). For example, the user interface module can receive user instructions from a web-based application with integrated document content editing and template logic generation functions. In some embodiments, the user interface allows a user to enter text into the template and insert corresponding template logic controlling the conditions in which the text will be visible. The user interface can allow the user to additionally add other features to an automatic template, such as an electronic signing field. In some embodiments, the user interface module 210 can determine a set of tagged data fields associated with an entity type of the CRM database 150 and make those available for inclusion in the automatic template through the interface of the user interface module 210. The tagged data fields and logic conditions function using "tags" inserted into the document content of the automatic template that serve as placeholders for corresponding data from the CRM database 150, which will be inserted into the generated document.

Template logic can comprise a set of logic conditions each linked to one or more data fields of the CRM database 150 (herein, a "logic trigger field"). In some embodiments, a logic condition can be satisfied based on the value of the associated data field for the generated document matching or having a target relationship to a value specified in the logic condition. For example, a logic condition can be satisfied when the associated logic trigger field is equal to, greater than, less than, within a range of, or of another similar relationship to a given value as defined by the logic condition. In other embodiments, logic conditions can rely on a corresponding logic trigger field existing, multiple logic conditions, or based on other logic conditions not being met. In some embodiments, the logic generation interface is inline within the document content. The user interface is described more in relation to FIGS. 4A-5B.

The CRM integration module 220, according to some embodiments, can analyze the structure of the CRM database 150 to determine a set data fields for potential inclusion in an automatic template. The CRM integration module 220 may search for and label data fields of the CRM database 150 as tagged data fields available for integration into an automatic template, for instance using document text entered by a user as a query term or keyword. The CRM integration module 220 can determine tagged data fields based on the structure of the CRM database 150 (for example, using the columns of a table or different data fields of a schema of the CRM database 150). The CRM integration module 220 can determine a set of tagged data fields for the user interface module 210 and the logic generation module 230 to use. In some embodiments, the CRM integration module 220 can generate a set of tagged data fields from the CRM database 150 based on the creation of a new automatic template or based on the selection of an entity type for the automatic template.

In the embodiment of FIG. 2, the logic generation module 230 generates a final automatic template based on the document content and the selected template logic input through the user interface module. An automatic template can be stored in a format allowing the generation of a document based on one or more selected entities from the CRM database 150.

Figure 3:
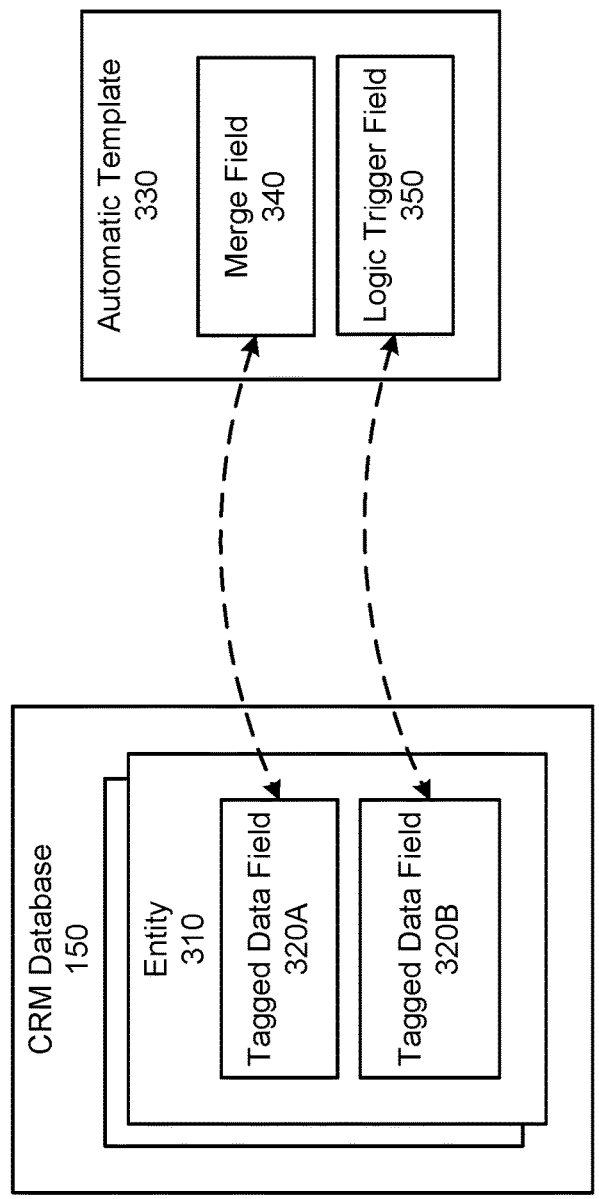
FIG. 3 is a block diagram illustrating a CRM database and a template, according to one embodiment.

FIG. 3 is a block diagram illustrating a CRM database and a template, according to one embodiment. The environment 300 of FIG. 3 includes the CRM database 150 with a set of entities 310 each with a tagged data field 320A and 320B and the automatic template 330 with a merge field 340 linked to tagged data field 320A and a logic trigger field 350 linked to tagged data field 320B.

As described above, the CRM database 150 stores information used to generate documents from an automatic template such as the automatic template 330. In some implementations, data stored in the CRM database 150 is organized into a plurality of entities 310 each containing the data fields identified by the CRM integration module 220 (in the embodiment of FIG. 3, the tagged data fields 320). For example, an entity 310 can represent a user profile, employee profile, or transaction information, as described above. Each tagged data field 320 of an entity 310 can label a specific type of data known about the entity 310. For example, the name, address, account number, service purchased, or quantity can be types of data associated with a tagged data field 320. The specific tagged data fields 320 will depend on the implementation and the information contained in the CRM database 150.

The automatic template 330, as described above, can include one or more references to tagged data fields 320 of the CRM database 150 which can be directly included in the document content or compared to logic conditions to determine if a conditional document section is included in a generated document.

Each merge field 340 of the automatic template 330 represents a point in the document content of the automatic template 330 where data or a value of a tagged data field 320A is inserted into the document content during the generation of a document. In the embodiment of FIG. 3, the automatic template 330 has a merge field 340 associated with the tagged data field 320A. The inclusion of a data value from a merge field 340 into the document can be direct or can involve formatting or otherwise manipulating the value of the tagged data field 320, for example by rounding numbers, adding dollar signs or punctuation, or adjusting capitalization.

As described above, a logic trigger field such as the logic trigger field 350 can be used as part of the template logic to determine if a conditional document section will be included in a generated document based on the value of the corresponding tagged data field 320B.

Example Template Creation Interface

FIGS. 4A-5B illustrate example user interfaces for interacting with the template creation module 120 of the automatic template system 110, according to some embodiments. The user interface module 210 can provide a user interface in any suitable manner, for example, the user interface module 210 can provide a web-based user interface through a website accessible to one or more user devices 140 over the network 160.

Figure 4A:
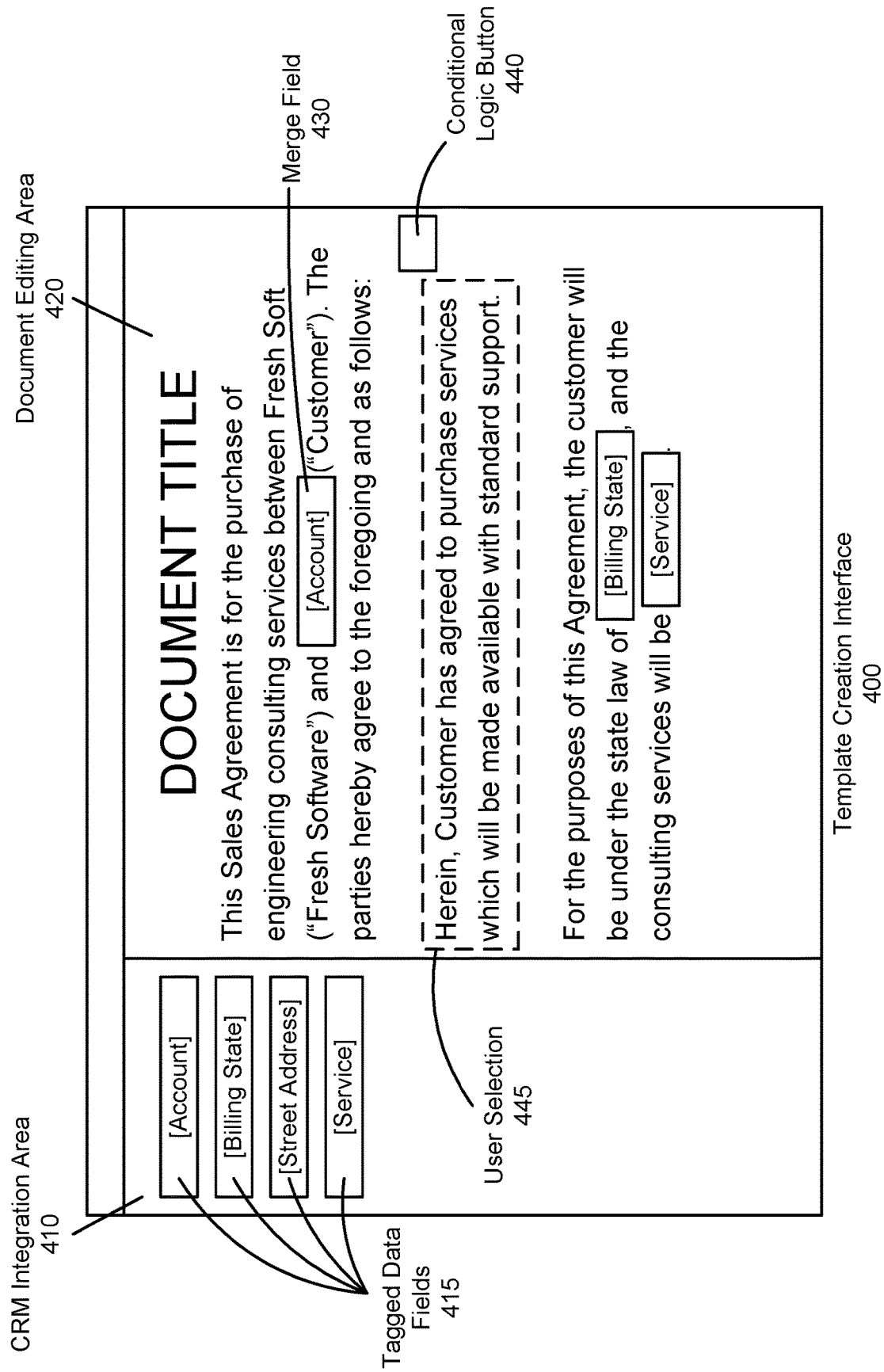
FIG. 4A illustrates a user interface for editing an automatic template, according to one embodiment.

FIG. 4A illustrates a user interface for editing an automatic template, according to one embodiment. The template creation interface 400 of FIG. 4A includes a CRM integration area 410 including a series of tagged data fields 415 and a document editing area 420 with document content including a merge field 430, a conditional logic button 440, and a user selection 445. The example automatic template illustrated in FIG. 4A is a template for generating a sales agreement, although the template creation interface 400 can be used to generate templates for other purposes, as discussed above.

The CRM integration area 410 allows a user of the template creation interface 400 to view available tagged data fields 415 that could potentially be included in the generated automatic template. As discussed above, the specific tagged data fields 415 available depend on the type of template being generated and the available data in the CRM database 150. In some embodiments, the CRM integration area 410 includes other options for fields that could be inserted into an automatic template not based on data from the CRM database 150, such as a current date field. Similarly, the automatic template system can include one or more fields which can be populated after the document is generated, for example a field for an e-signature or a date signed field. In the embodiment of FIG. 4A, the CRM integration area 410 is designed for a drag and drop interface to insert the tagged data fields 415 as merge fields 430 or logic trigger fields, although other embodiments can use a menu or other selection process to access the tagged data fields 415.

The document editing area 420, according to some embodiments, allows a user to enter, edit, and delete the document content, template logic, and conditional document text of an automatic template. In some implementations, the document editing area 420 can provide text editing and/or formatting features for entering and manipulating document content (for example, font size, line spacing, etc.).

The document editing area 420 allows a user to insert merge fields, such as the merge field 430, into an automatic template being edited. As described above, when a document is generated from an automatic template, the appropriate data from the entity of the CRM database 150 associated with the document will be retrieved and inserted into each merge field 430 of the generated template. In some embodiments, merge fields 430 can be inserted into an automatic template in any suitable way, such as with a drag and drop interface from the CRM integration area 410 into the document editing area 420 or through a selection from the menu.

In the embodiment of FIG. 4A, the conditional logic button 440 allows a user to insert and/or change template logic using an inline logic interface within the document editing area 420. In some embodiments, the conditional logic button 440 and/or the interface for editing template logic can be contextually triggered, for example the conditional logic button 440 can appear near the location of a user's text cursor (caret) or when a user makes a selection of certain document content, such as the user selection 445. When selected, the conditional logic button can insert template logic for currently selected text or open a logic interface for editing template logic. The user interface for adding or modifying template logic will be discussed further in relation to FIGS. 5A and 5B.

Figure 4B:
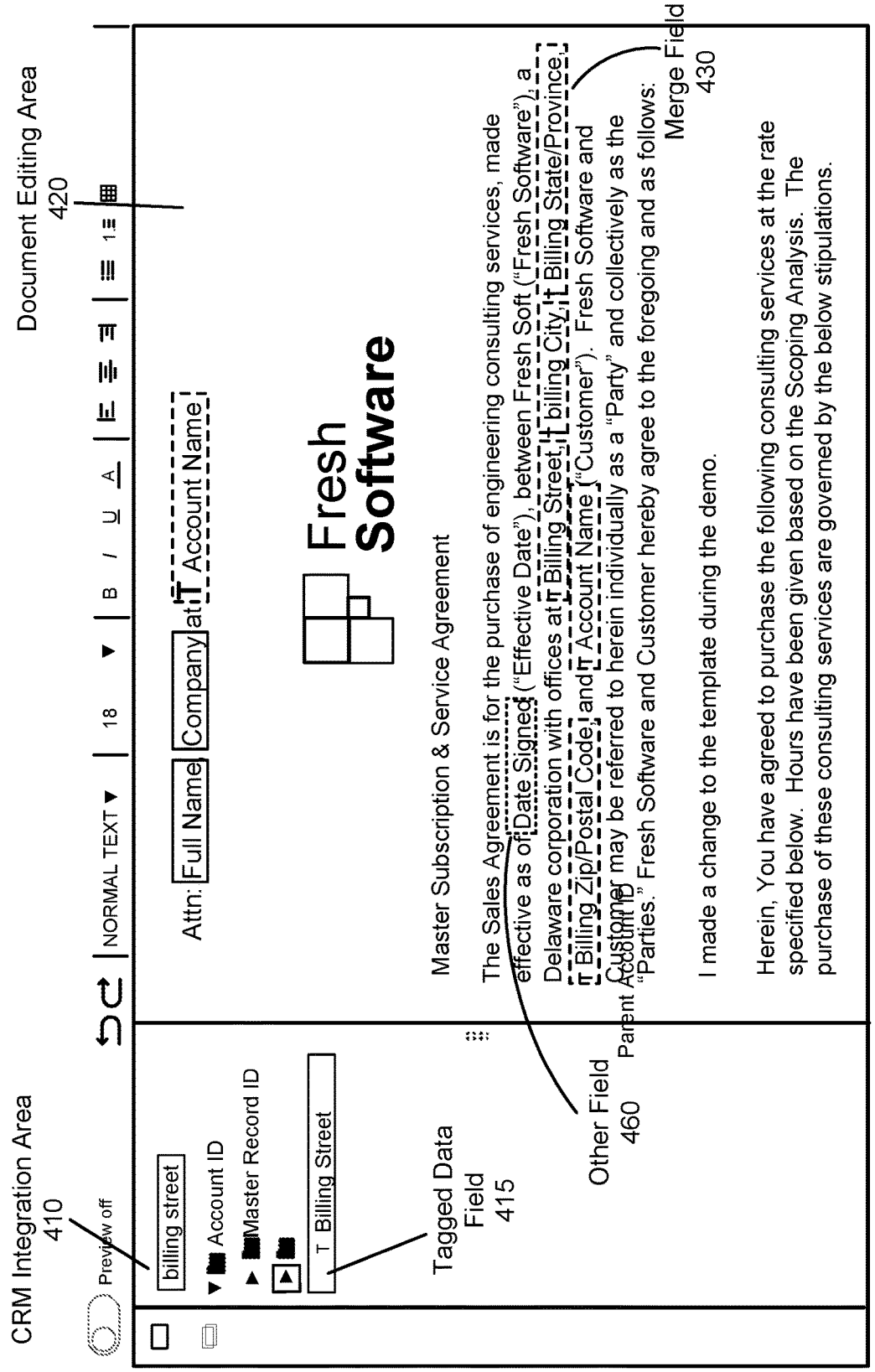
FIG. 4B illustrates an alternative user interface for editing an automatic template, according to one embodiment.

FIG. 4B illustrates an alternative user interface for editing an automatic template, according to one embodiment. The template creation interface 450 includes a CRM integration area 410, tagged data field 415, document editing area 420, and merge field 430 as described above as well as the other field 460. Here, the other field 460 is a field which can be populated after the document is generated as described above.

Figure 5A:
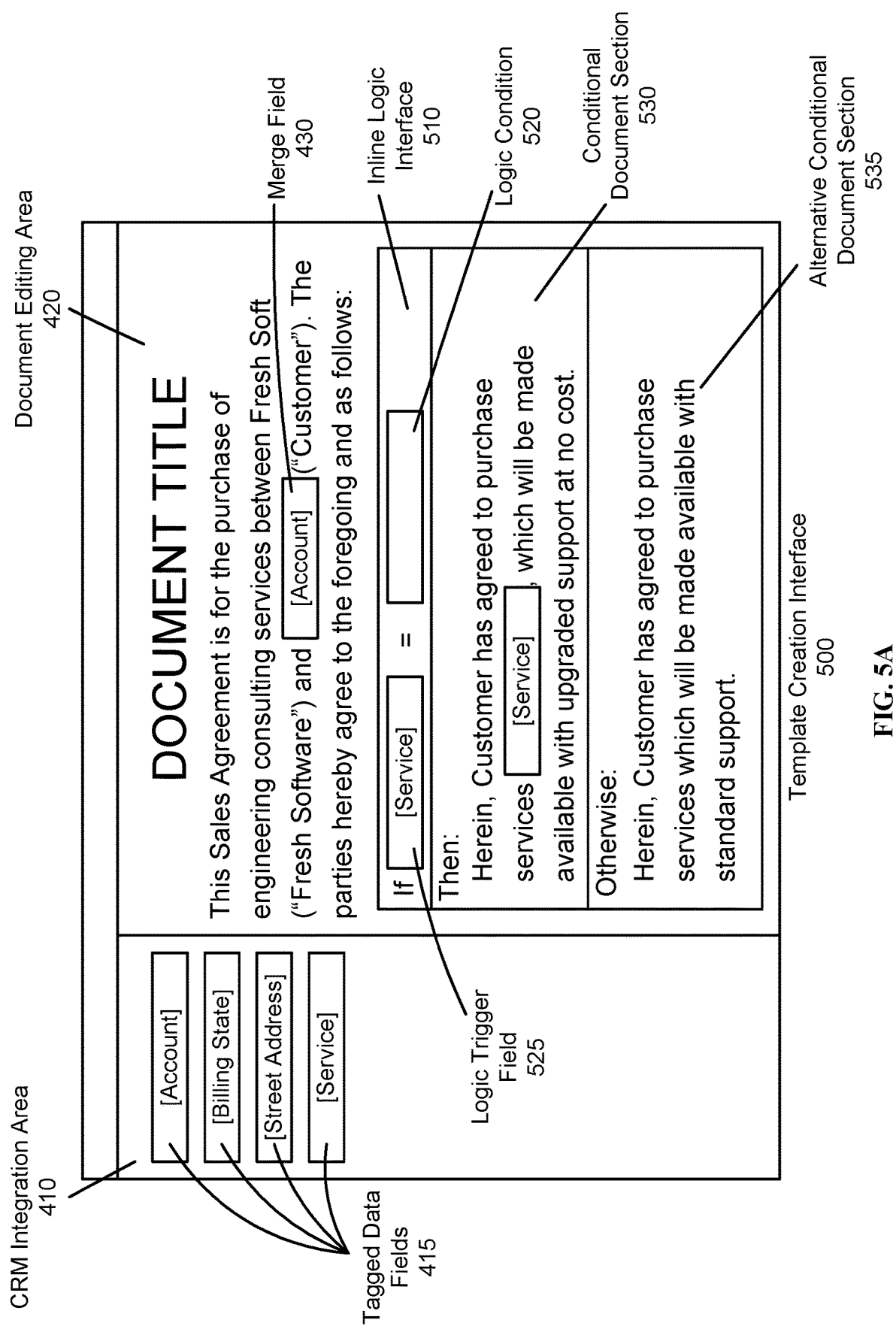
FIG. 5A illustrates a user interface for editing template logic in an automatic template, according to one embodiment.

FIG. 5A illustrates a user interface for editing template logic in an automatic template, according to one embodiment. The template creation interface 500 of FIG. 5A is an additional view of the template creation interface 400 of FIG. 4A. The template creation interface 500 includes a CRM integration area 410 including a series of tagged data fields 415 and a document editing area 420 with document content including a merge field 430 and an inline logic interface 510. The inline logic interface 510 includes a logic condition 520, a logic trigger field 525, a conditional document section 530, and an alternative conditional document section 535. The example automatic template illustrated in FIG. 5A is for generating a sales agreement, although the template creation interface 500 can be used to generate templates for other purposes, as discussed above.

In some embodiments, when a user selects the conditional logic button 440 shown in FIG. 4A (or otherwise initiates editing template logic) the inline logic interface 510 is shown within the document editing area 420. In the embodiment of FIG. 5A, the location of the inline logic interface 510 within the document content is based on the location of the user's text cursor, the user selection 445, or other selection by the user.

The inline logic interface 510 allows the user to set up one or more logic rules or other template logic for an automatic template. In some embodiments, the inline logic interface 510 can be displayed inline with the document content of the document editing area 420 appearing in between sections of the document content where document content corresponding to the logic rule will be inserted.

Each logic rule of an automatic template can comprise a logic condition 520 which can be compared to the value retrieved of a logic trigger field 525 to determine if (or in what form) a conditional document section 530 appears in a given document generated using the automatic template. In some embodiments, logic conditions 520 include a value (or range) which the value of the logic trigger field 525 will be compared against using a suitable operation such as equality, greater than, or less than operations. Other implementations of a logic condition 520 can rely on other data about the logic trigger field, for example being satisfied if the data associated with the logic trigger field 522 exists in the CRM database 150. The value associated with a logic condition 520 can be a static value or can be dynamic based on, for example, a tagged data field 415 (such as in a logic rule comparing the value of two tagged data fields).

The logic trigger field 525, similar to a merge field 430, can be associated with a tagged data field 415 of the CRM database 150. When a document is generated from an automatic template containing a logic rule with a logic trigger field, the appropriate data from the tagged data field 415 associated with the logic trigger field 525 will be retrieved and compared to the logic condition 520 of the logic rule. In some embodiments, logic trigger fields 525 can be inserted into an automatic template in any suitable way, such as with a drag and drop interface from the CRM integration area 410 into the inline logic interface 510 or through a selection from a menu. A logic trigger field 525, according to some implementations, can be filled using any suitable data field (not only a tagged data field 415 associated with the CRM database 150, for example a current date logic trigger field 525 in a logic rule to insert a holiday greeting at the correct time of year.

The conditional document section 530 is a section of document content included in a generated document if the logic condition 520 is satisfied. In some implementations, the conditional document section 530 can include any features available to other document content not associated with a logic rule, such as merge fields 430 and formatting. As show in FIG. 5A the conditional document section 530 is contiguous, but other implementations include non-contiguous conditional document sections 530 (for example, in the case of a logic rule inserting an optional warning at the top of each page of a generated document).

In some implementations, a logic rule can be associated with multiple logic conditions 520, each with their own logic trigger field 525 and conditional document section 530, where only one conditional document section 530 (if any) will be included in a generated document based on which of the logic conditions 520 are satisfied. For example, the logic conditions 520 can be organized in an order or hierarchy and the first rule in the order/highest logic condition 520 in the hierarchy that is satisfied controls which conditional document section 530 is included in a given generated document. Similarly, a logic rule can be associated with an alternative conditional document section 535 which is included in a generated document if no logic condition 520 associated with the logic rule is satisfied. However, the inclusion of an alternative conditional document section 525 is optional and a logic rule may result in nothing being included in a generated document if the logic condition 520 isn't satisfied, according to some embodiments.

Figure 5B:
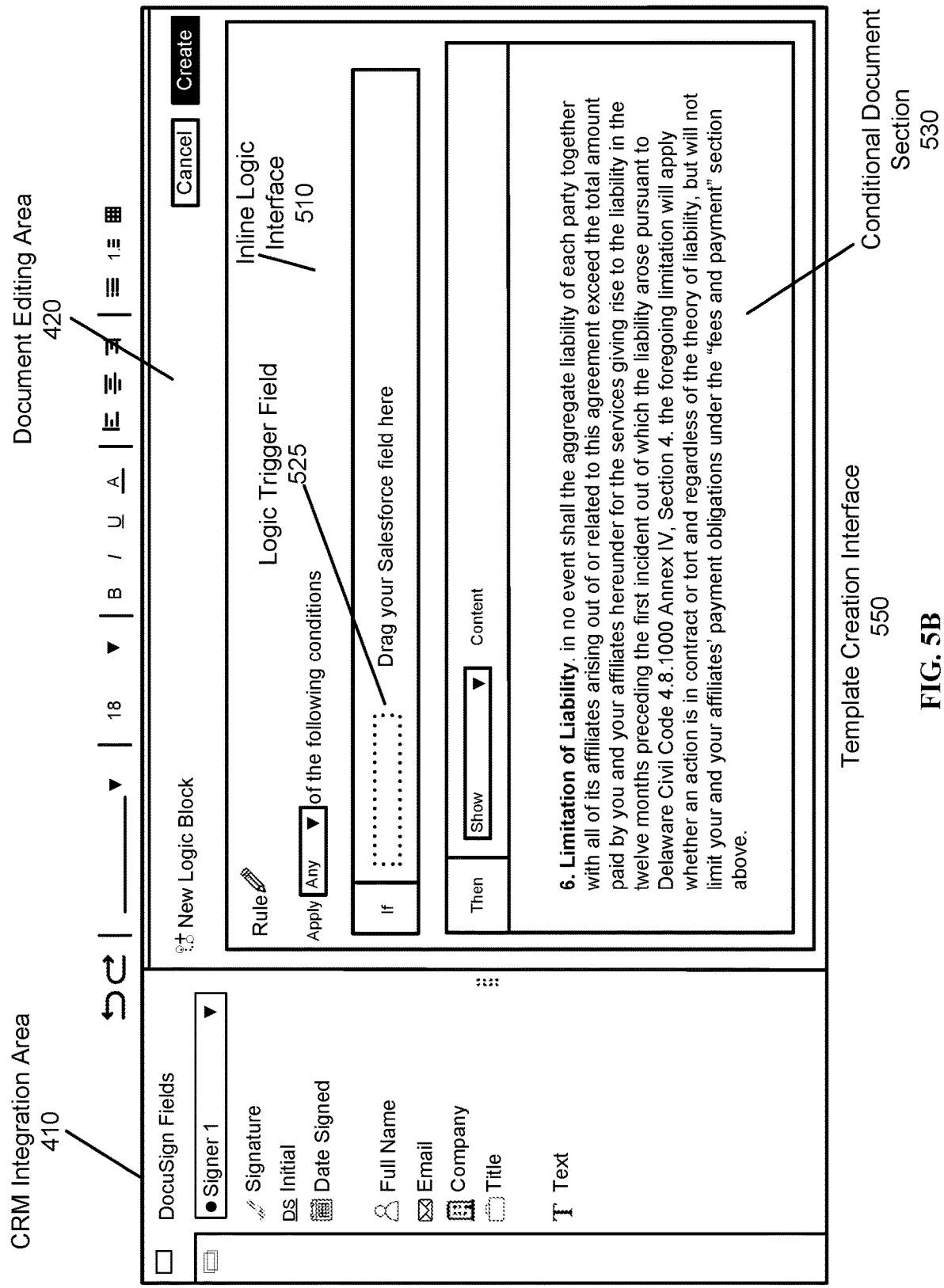
FIG. 5B illustrates an alternative user interface for editing template logic in an automatic template, according to one embodiment.

FIG. 5B illustrates an alternative user interface for editing template logic in an automatic template, according to one embodiment. The template creation interface 550 includes a CRM integration area 410, document editing area 420, inline logic interface 510, logic trigger field 525, and conditional document section 530 as described above.

Template Generation Process

Figure 6:
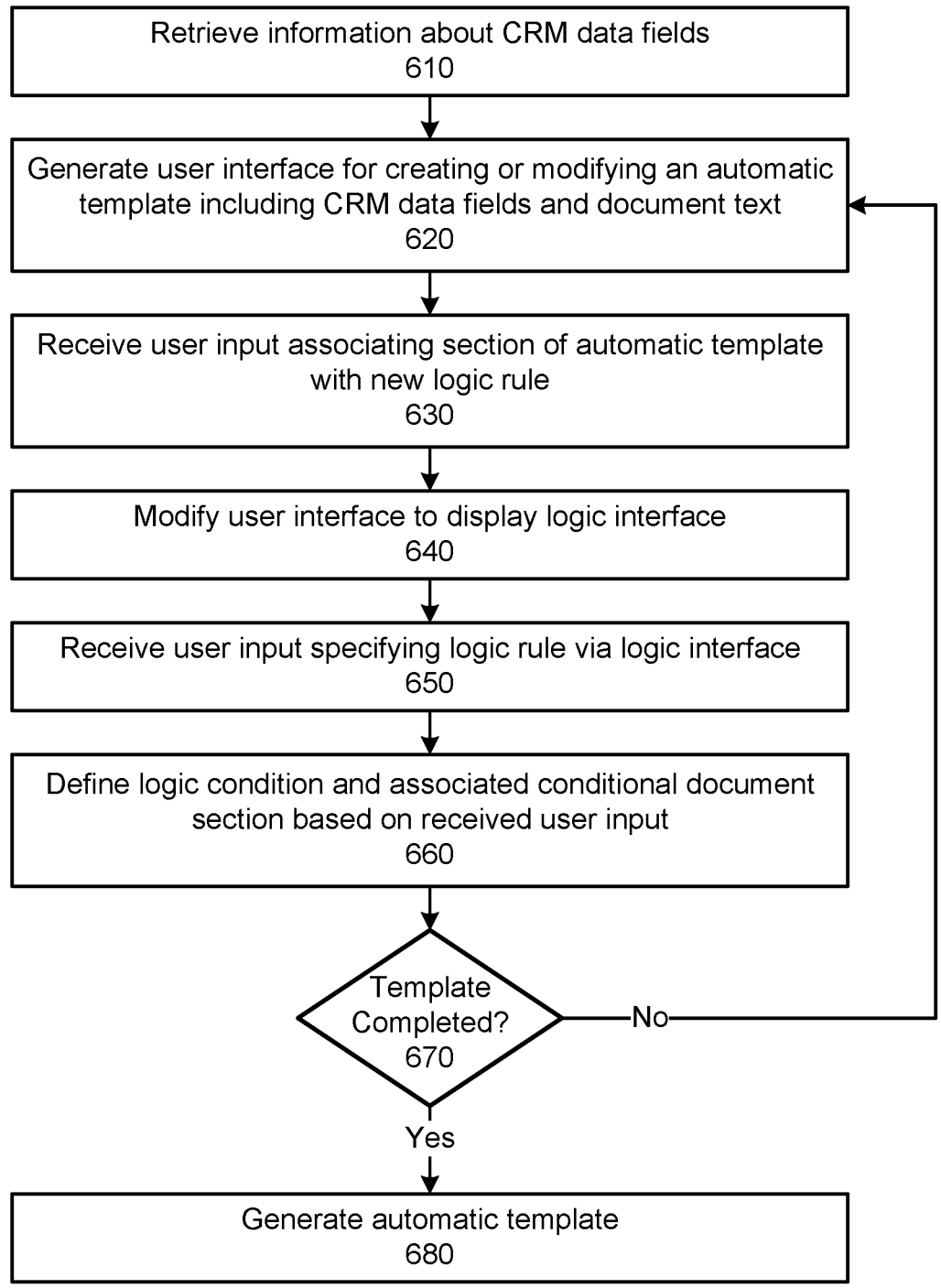
FIG. 6 is a flowchart illustrating a process for generating an automatic template and template logic, according to one embodiment.

FIG. 6 is a flowchart illustrating a process for generating an automatic template and template logic, according to one embodiment. The process 600 begins when the automatic template system retrieves 610 information about data fields of a linked CRM database. For example, an automatic template system can determine a set of tagged data fields based on retrieved information from a CRM database. Based on the retrieved CRM database information, the automatic template system can generate 620 a user interface for creating or modifying an automatic template, where the user interface includes the CRM data fields and document content for the automatic template. When the automatic template system receives 630 user input associating a section of the automatic template with a logic rule. In some embodiments, the user can alternatively provide user input indicating a desire to modify an existing logic rule. In response to the user input, the automatic template system can modify 640 the displayed user interface to include a logic interface for editing the logic rule. Through the logic interface, the automatic template system receives 650 user input specifying the logic rule and defines 660 a logic condition and conditional document section for the logic rule within the automatic template. For example, the logic rule can be specified through a series of inputs defining a logic condition, tagged data field, and conditional document section which can then be reflected in the automatic template. If the automatic template configuration is completed 670 (for example, based on receiving a user input to that effect), the automatic template system generates 680 the finalized automatic template for later use to generate documents. Otherwise, the process returns to step 620 for further modifications to the automatic template using the generated user interface.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   retrieving, from a customer relationship management (CRM) system, a plurality of tagged data fields, each tagged data field representing a category of data corresponding to a database entry of the CRM system;
   generating a user interface (UI) allowing a user to edit a template comprising document content and template logic, the UI comprising:
   a CRM integration interface portion comprising the plurality of tagged data fields; and
   a document editing interface portion comprising editable document content and one or more merge fields, each merge field associated with a tagged data field of the plurality of tagged data fields;
   receiving, from the user via the UI, a user input to create a logic rule associated with a portion of the editable document content; and
   responsive to receiving the user input, modifying the document editing interface portion to display a logic interface, the logic interface allowing the user to 1) define a logic condition associated with a selected tagged data field of the plurality of tagged data fields and 2) associate the logic condition with a conditional document section, and the logic interface configured to, responsive to data within the tagged data field satisfying the logic condition, modify an appearance of the conditional document section when the template is used to generate a document.

2. The method of claim 1, wherein the logic condition comprises a logic value and a target relationship of the logic value to the value of the selected tagged data field for the logic condition to be satisfied.

3. The method of claim 2, further comprising receiving, from the user via the logic interface, a logic value and a target relationship defining the logic condition.

4. The method of claim 2, wherein the target relationship is selected from a group consisting of equal to, greater than, and less than.

5. The method of claim 1, wherein the logic interface is further configured to, responsive to data within the tagged data field not satisfying the logic condition, modify an appearance of the conditional document section to display an alternative conditional document section when the template is used to generate the document.

6. The method of claim 1, wherein modifying the document editing interface portion to display a logic interface comprises displaying the logic interface inline within the editable document content at a position previously occupied by the portion of the editable document content.

7. The method of claim 1, wherein receiving a user input to create a logic rule associated with a portion of the editable document content comprises determining the portion of the editable document based on a current position of a text selection cursor within the document editing interface portion.

8. The method of claim 1, wherein receiving a user input to create a logic rule associated with a portion of the editable document content comprises determining the portion of the editable document based on a current user selection of editable document content within the document editing interface portion.

9. The method of claim 1, wherein receiving a user input to create a logic rule comprises receiving a selection of a selectable interface element corresponding to logic rule creation.

10. The method of claim 1, wherein defining a logic condition associated with a selected tagged data field of the plurality of tagged data fields within the logic interface comprises a drag and drop of a tagged data field from the CRM integration interface portion to the logic interface.

11. A non-transitory computer readable storage medium comprising instructions which, when executed by a processor, cause the processor to perform steps comprising:

retrieving, from a customer relationship management (CRM) system, a plurality of tagged data fields, each tagged data field representing a category of data corresponding to a database entry of the CRM system;

generating a user interface (UI) allowing a user to edit a template comprising document content and template logic, the UI comprising:

a CRM integration interface portion comprising the plurality of tagged data fields; and a document editing interface portion comprising editable document content and one or more merge fields, each merge field associated with a tagged data field of the plurality of tagged data fields;

receiving, from the user via the UI, a user input to create a logic rule associated with a portion of the editable document content; and responsive to receiving the user input, modifying the document editing interface portion to display a logic interface, the logic interface allowing the user to 1) define a logic condition associated with a selected tagged data field of the plurality of tagged data fields and 2) associate the logic condition with a conditional document section, and the logic interface configured to, responsive to data within the tagged data field satisfying the logic condition, modify an appearance of the conditional document section when the template is used to generate a document.

12. The non-transitory computer readable storage medium of claim 11, wherein the logic condition comprises a logic value and a target relationship of the logic value to the value of the selected tagged data field for the logic condition to be satisfied.

13. The non-transitory computer readable storage medium of claim 12, wherein the steps further comprise receiving, from the user via the logic interface, a logic value and a target relationship defining the logic condition.

14. The non-transitory computer readable storage medium of claim 12, wherein the target relationship is selected from a group consisting of equal to, greater than, and less than.

15. The non-transitory computer readable storage medium of claim 1, wherein the logic interface is further configured to, responsive to data within the tagged data field not satisfying the logic condition, modify an appearance of the conditional document section to display an alternative conditional document section when the template is used to generate the document.

16. The non-transitory computer readable storage medium of claim 11, wherein modifying the document editing interface portion to display a logic interface comprises displaying the logic interface inline within the editable document content at a position previously occupied by the portion of the editable document content.

17. The non-transitory computer readable storage medium of claim 11, wherein receiving a user input to create a logic rule associated with a portion of the editable document content comprises determining the portion of the editable document based on a current position of a text selection cursor within the document editing interface portion.

18. The non-transitory computer readable storage medium of claim 11, wherein receiving a user input to create a logic rule associated with a portion of the editable document content comprises determining the portion of the editable document based on a current user selection of editable document content within the document editing interface portion.

19. The non-transitory computer readable storage medium of claim 11, wherein receiving a user input to create a logic rule comprises receiving a selection of a selectable interface element corresponding to logic rule creation.

20. The non-transitory computer readable storage medium of claim 11, wherein defining a logic condition associated with a selected tagged data field of the plurality of tagged data fields within the logic interface comprises a drag and drop of a tagged data field from the CRM integration interface portion to the logic interface.

* * * * *